Figure 1:
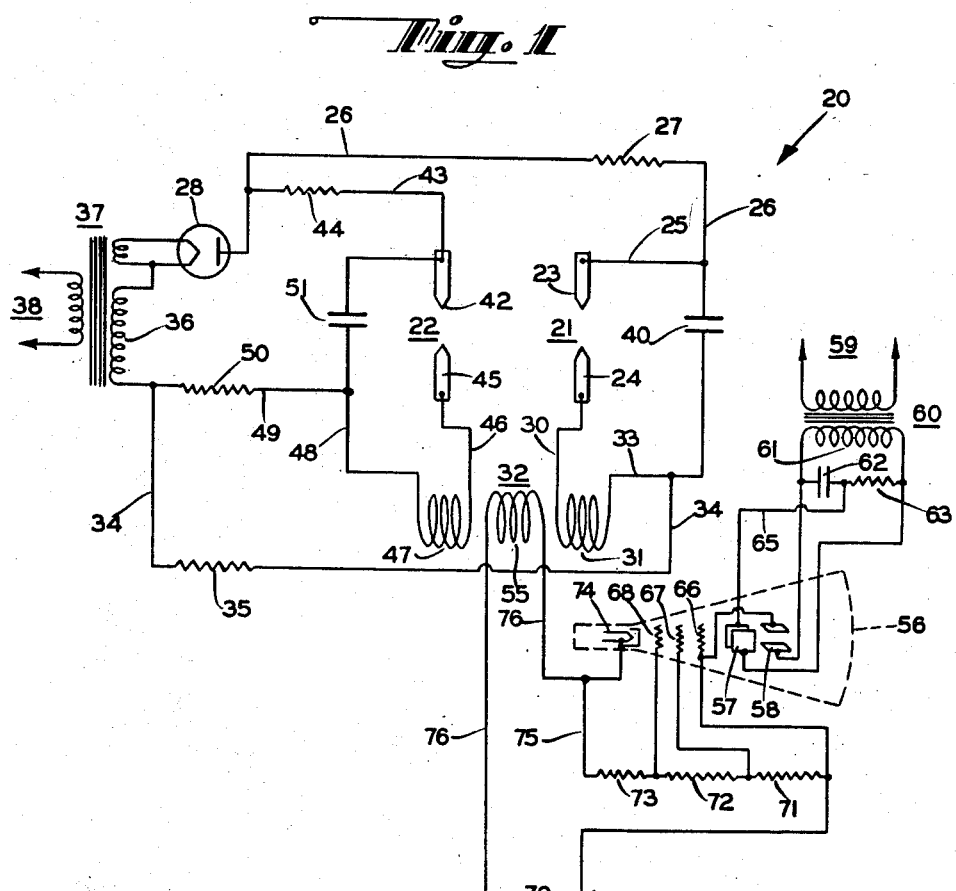

INVENTOR.
ALFRED A. STUART

United States Patent Office 2,783,647
Patented Mar. 5, 1957

2,783,647

IONIZING TRUE AIRSPEED INDICATOR

Alfred A. Stuart, Ridgewood, N. J., assignor to Bendix Aviation Corporation, Teterboro, N. J., a corporation of Delaware Original application June 18, 1948, Serial No. 33,390, now Patent No. 2,679,162, dated May 25, 1954. Divided and this application October 1, 1953, Serial No. 383,466

3 Claims. (Cl. 73—194)

This invention relates to a method and means for measuring the velocity of a flowing fluid medium, and more particularly to a true airspeed meter for indicating the velocity of aircraft in the subsonic, sonic and supersonic ranges of airspeed. This application is a division of application Serial No. 33,390, filed June 18, 1948, now Patent No. 2,679,162, issued May 25, 1954.

Prior devices for measuring the velocity of a fluid medium, excluding the vane and impeller types, relied upon the differential in the ambient or static pressure and the impact or dynamic pressure of the gas or liquid measured. Such measuring instruments were susceptible to serious errors due to the changes in the temperature and the density of the fluid medium. Various expedients were thus required to correct the readings of these meters.

In the airspeed meters used for indicating the velocity of an aircraft, compensation for air temperature and air density is required to obtain a true airspeed indication. The present airspeed instruments are normally provided with a differential pressure responsive member subjected to dynamic pressure on one side and static air pressure on the other. A pointer driven over a calibrated dial by the movement of the differential pressure member would show indicated airspeed in contradistinction to true airspeed. In order to compensate for the errors arising by the varying ambient conditions, two aneroid capsules are ordinarily provided together with interconnecting linkages to correct the meter readings for the temperature and density variations of the air. Further compensation is also provided by the use of bimetal strips and/or pivots to correct for the ambient temperature of the instrument case.

While the present day airspeed meter, when compensated as indicated, does provide a fairly accurate reading of the true airspeed of a craft, the present development of the turbine and jet engines and the use of rocket power to propel aircraft beyond the sonic barrier, has made the use of pressure responsive airspeed meters impractical. At subsonic, sonic, and supersonic speed levels attained by the new engines developed, and at the extreme high altitudes of flight now made and contemplated, the pressure responsive members as now used in airspeed meters are inaccurate and rupture easily.

It is, therefore, an object of my present invention to provide a meter for indicating the velocity of a fluid which is independent of the pressure of the flowing fluid.

Another object of my present invention is to provide a fluid velocity meter of the general character indicated which is independent of the temperature and/or the density of the flowing fluid.

Still another object of this invention is to provide a fluid velocity meter of the character indicated which shall be well adapted for use as a true airspeed meter for indicating the airspeed of aircraft at the subsonic, sonic, and supersonic speed levels and at all altitudes of flight level.

Yet another object of the invention is to provide a true airspeed meter for aircraft which shall be unaffected by shock waves encountered in entering and passing through the sonic speed barrier.

A further object of my present invention is to provide a fluid velocity meter of the character indicated in which the fluid medium is electrostatically charged, the velocity of the fluid medium being a measure of the time interval required for the charges to be carried between two known points.

Still a further object of my invention is to provide a fluid velocity meter of the character indicated in which the transit time of the electrostatic charges provides a time phase delay which is a measure of the velocity of the fluid medium.

An another object of this invention is to provide a fluid velocity meter of the character described in which the transit time of the electrostatic charges may be indicated on a cathode ray screen.

Yet another object of this invention is to provide a fluid velocity meter of the character described in which the velocity of the fluid medium may be indicated directly in linear distance per unit of time.

Still another object of my present invention is to provide a true airspeed meter incorporating the features described which shall be automatic and positive in its operation, relatively inexpensive to manufacture, which shall consist of few and simple parts and circuit elements, light in weight and small in size, which shall have a large variety of applications, and yet be practical and efficient to a high degree in use.

Other objects of this invention will in part be obvious, and in part hereinafter pointed out.

In carrying out one embodiment of my invention, I provide an ionization source which comprises, in this instance, a spark gap in the stream of the fluid medium. Downstream at a fixed distance from the first spark gap, I place a second spark gap. The first spark gap is adjusted to fire periodically by means of predetermined electrical circuit constants. The periodic firing of the first spark gap will provide an interrupted stream of ions which is carried by the fluid medium. The second spark gap is adjusted so as not to fire unless a group of ions carried by the fluid medium upon discharge of the first gap, is between the electrodes. As the ions traverse the second spark gap, its sparking potential will be lowered due to the presence of the ions, resulting in a discharge of the second spark gap.

Knowing the distance between the two spark gaps, the transit time of the ions and thus of the fluid of which they are a part can be measured and the velocity determined. A cathode ray tube having a circular pattern may be used for determining the velocity of the fluid medium. The discharge of the first gap provides a voltage pulse which will momentarily reduce the voltage applied to the electrodes of the cathode ray tube causing the cathode spot to move radially outwardly from the sweep circle. The discharge of the second gap will also provide a pip in the sweep circle of the cathode ray tube, the angular separation of the two pips being inversely proportional to the true velocity of the fluid medium.

As an alternative method of the first embodiment of my invention, the second spark gap may be replaced by a single electrode. The electrode or probe will collect a charge due to the electrostatic charges of the first spark gap. This induced impulse may be suitably amplified and serve as the signal to produce the second pip on the cathode ray tube.

Figure 2:
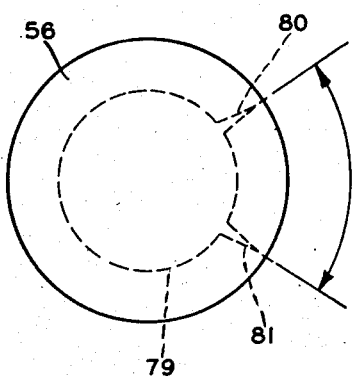

In the accompanying drawings forming a part of this specification, in which several possible illustrative embodiments of this invention are shown, and wherein similar reference characters designate corresponding parts through the several views;

Fig. 1 is a schematic wiring diagram illustrating the use of two spark gaps in carrying out my invention, Fig. 2 is a front view of a cathode ray tube showing the visual indication given thereby for indicating the fluid velocity.

Referring now in detail to Figs. 1 and 2 of the drawings in which one of the various possible embodiments of my invention is illustrated, the numeral 20 indicates a circuit for measuring the speed of a fluid flowing past a stationary object, or the speed of an object, such as an aircraft through a fluid medium.

The circuit 20 includes two spark gaps 21 and 22, spaced a short distance apart, say approximately two inches, and placed in the stream of the fluid medium. The spark gap 21 will hereinafter be referred to as the firing gap and is placed upstream of the receiving or pickup spark gap 22.

The firing gap 21 comprises two electrodes 23 and 24 connected across a source of high potential. The electrode 23 is connected by leads 25 and 26 through a resistor 27 to the plate of a half wave rectifier 28. The electrode 24 is connected by a lead 30 through a primary winding 31 of a transformer 32, and thence by leads 33 and 34 through a resistor 35 to the cathode of tube 28 through the secondary winding 36 of a step up transformer 37 connected across an alternating current power supply 38. A condenser 40 connected across the spark gap 21 by the leads 25 and 33 completes the firing gap circuit.

The pickup gay 22 is similarly connected across the power supply 38, 37, 28 and to the transformer 32. The electrode 42 is connected by a lead 43 through a resistor 44 to the plate of the diode 28, while the electrode 45 is connected by a lead 46 through a second primary winding 47 on the transformer 32 and by leads 48, 49 through a resistor 50 to the cathode of the diode 28. The condenser 51 is connected across the pickup gap by the leads 43 and 48.

The two spark gaps are placed in line with respect to the flow of the fluid medium. By proper selection of the circuit constants, the firing gap is adjusted to fire periodically, while the pickup gap is adjusted so that it will not fire until a group of ions formed by the discharge of the firing gap is carried downstream by this fluid medium and passes between the electrodes 42, 45. The charging rate of condenser 40 is determined by the value of the two series connected resistors 27 and 35. Thus the periodic firing of the spark gap 21 due to the discharge of condenser 40 will provide a group of ions periodically which is carried downstream by the fluid to pass between the electrodes 42, 45 of the pickup gap.

The discharge of the pickup gap is adjusted by the proper selection of impedance values of the series resistors 44 and 50, and of the condenser 51. The values are so chosen that the spark gap 22 will not fire until a group of ions resulting from the discharge of the firing gap passes between the electrodes. The group of ions between the electrodes will reduce the resistance of the gap thereby reducing the required sparking potential. This potential is provided by the charged condenser 51 and results in the firing of the pickup gap.

Since the sequential firing of the two spark gaps provides surges of current in the spark gap circuits, and knowing the distance at which the gaps are spaced apart, the velocity of the fluid medium may readily be determined by measuring the time interval between the current surge due to the firing gap and the current surge of the resultant firing of the pickup gap.

To this end the transformer 32 is provided, the two primary windings 31 and 47 of which are connected in the respective spark gap circuits. A single secondary winding 55 is provided on the transformer in which voltage surges are induced upon the sequential firing of the two spark gaps provided. The output of the transformer 32 is applied to the control grids of a cathode ray tube 56 to present a visual indication of the elapsed time interval, of the velocity of the fluid.

The cathode ray tube 56 is provided with the horizontal deflector plates 57 and the vertical deflector plates 58 supplied from a suitable source of A. C. potential 59 through a transformer 60. The secondary winding 61 of the transformer is shunted by a series connected condenser 62 and a resistor 63. The ends of winding 61 are connected to a deflector plate 57 and 58, while a tap off between the condenser 62 and resistor 63 is connected by a lead 65 to the second deflector plate 57. The second deflector plate 58 is connected internally to anode 66 of the tube. The anode 66, the focusing electrode 67 and the grid 68 are connected to a D. C. high voltage supply 70 through series connected dropping resistors 71, 72, and 73, respectively. The end of resistor 73 is connected to the indirectly heated cathode 74 of the tube by a lead 75, and via lead 76 and the secondary transformer winding 55 to the negative side of the voltage supply 70. The impedance values of the condenser 62 and the resistor 63 are so chosen that a circular sweep pattern 79 is produced upon the screen of the cathode tube (Fig. 2).

The surges of voltage induced in the secondary winding 55 of the coupling transformer 32 due to the discharge of the spark gaps 21 and 22, are applied in series with the high voltage source 70 to the control electrodes of the cathode tube 56. The surge of voltage due to the discharge of the firing gap 21 will momentarily lower the voltage applied to the electrodes, causing the cathode spot to move radially outwardly from the sweep circle to form a "pip" 80 on the screen (Fig. 2). The resulting discharge of the pickup electrode 22 will form a second "pip" 81 on the screen. Since the distance between the two spark gaps is known, the angular distance between the two "pips" on the cathode tube screen will be indicative of the elapsed time taken for a group of ions to travel from the firing gap 21 to the pickup gap 22. The angular separation of the two pips is therefore inversely proportional to the velocity of the fluid medium flowing past the two spark gaps.

As an alternative method of carrying out the first embodiment described, the receiving spark gap 22 may be replaced by an electrode or probe. The charges collected by and/or induced in the pickup electrode may be amplified and applied to the cathode ray tube to provide the second pip 81 on the screen.

It will thus be seen that there is provided a velocity indicator in which the several objects of this invention are achieved, and which is well adapted to meet the conditions of practical use.

As various possible embodiments of the above invention might be made, and as various changes might be made in the embodiments above set forth, it will be understood that all matter herein set forth, or shown in the accompanying drawings, is to be interpreted as illustrative and not in a limiting sense.

Having thus described my invention, I claim as new and desire to secure by Letters Patent:

1. A fluid velocity meter, comprising a first spark gap located in flowing fluid, a second spark gap located in the path of fluid flowing from the first spark gap, means for firing the first spark gap to provide a group of ions flowing with the fluid, including a firing circuit connected to the first spark gap, means for firing the second spark gap only upon the presence of said ions in the second spark gap, including a firing circuit connected to the second spark gap, a transformer including a primary inductance element in each circuit and a secondary inductance element inductively related to both primary elements, and a velocity indicator responsive to impulses from said secondary element.

2. A fluid velocity meter comprising a spark gap placed in the stream of the flowing fluid, a second spark gap placed in the fluid medium downstream from said first spark gap, a circuit including a source of high potential for said spark gaps, means in said circuit to fire said first gap periodically to provide a group of ions adapted to be carried by the fluid medium to said second gap, means in said circuit to fire said second gap only upon the presence of ions in said second gap, a transformer in said circuit connected to both of said gaps for providing electrical surges in the secondary thereof responsive to the firing of said spark gaps, and means responsive to said surges for indicating the velocity of said fluid.

3. A fluid velocity meter comprising a spark gap placed in the stream of the flowing fluid, a second spark gap placed in the fluid medium downstream from said first spark gap, a circuit including a source of high potential for said spark gaps, means in said circuit to fire said first gap periodically to provide a group of ions adapted to be carried by the fluid medium to said second gap, means in said circuit to fire said second gap only upon the presence of ions in said second gap, a transformer in said circuit connected to both of said gaps for providing electrical surges in the secondary thereof responsive to the firing of said spark gaps, and a cathode ray tube having control grids connected to the transformer secondary for indicating the transit time of each group of ions carried from the first of said spark gaps to the second gap by the fluid medium.

References Cited in the file of this patent

UNITED STATES PATENTS

| | | |
|---|---|---|
| 2,178,074 | Jakel et al. | Oct. 31, 1939 |
| 2,450,341 | Hershberger | Sept. 28, 1948 |
| 2,569,974 | Campbell | Oct. 2, 1951 |